United States Patent
Padula

Patent Number: 5,579,158
Date of Patent: Nov. 26, 1996

[54] BINOCULAR EXPANDED FIELD OF VIEW SPECTACLE MOUNTED MICROSCOPE

[76] Inventor: William V. Padula, P.O. Box 1408, Guilford, Conn. 06437

[21] Appl. No.: 432,108

[22] Filed: May 1, 1995

Related U.S. Application Data

[63] Continuation-in-part of Ser. No. 40,458, Apr. 1, 1993, abandoned.

[51] Int. Cl.⁶ .......................... G02B 27/02; G02B 21/22; G02C 1/00
[52] U.S. Cl. .......................... 359/482; 359/375; 359/384; 359/407; 359/480; 351/158
[58] Field of Search .................... 359/362, 365, 359/366, 368–369, 373, 375–379, 384, 389, 407, 462, 471–474, 478–482, 618–630; 351/41, 45, 50, 51, 205, 214, 158; 2/10, 12, 453

[56] References Cited

U.S. PATENT DOCUMENTS

| | | | |
|---|---|---|---|
| 1,840,878 | 1/1932 | Abrams | 359/482 |
| 3,592,524 | 7/1971 | Schlienger | 359/474 |
| 3,963,329 | 6/1976 | Stumpf et al. | 351/205 |
| 4,457,584 | 7/1984 | Pryor | 359/471 |
| 4,568,970 | 2/1986 | Rockstead | 359/471 |
| 4,682,866 | 7/1987 | Volk | 351/205 |
| 4,807,987 | 2/1989 | Bastable et al. | 351/205 |
| 4,838,671 | 6/1989 | Papritz et al. | 359/480 |
| 4,838,678 | 6/1989 | Hubertus | 351/205 |
| 5,124,840 | 6/1992 | Trumbull et al. | 359/472 |
| 5,223,863 | 6/1993 | Heine et al. | 351/205 |
| 5,233,458 | 8/1993 | Moffitt et al. | 359/407 |

FOREIGN PATENT DOCUMENTS

| 66361 | 3/1993 | Japan | 359/407 |
|---|---|---|---|

*Primary Examiner*—Thong Nguyen
*Attorney, Agent, or Firm*—Koda and Androlia

[57] ABSTRACT

A binocular expanded field of view spectacle mounted microscope including a single microscope provided in front of and mounted to a bridge of a spectacle frame, a first pair of optical path deflectors rotatably connected to the spectacle frame of each side of the bridge of the frame and projecting into a line of sight and visual axis in a direction of the microscope and a second pair of optical path deflectors mounted on the spectacle frame such that a line sight and visual axis from the microscope deflected by the first pair of optical path deflectors is directed towards each eye of a wearer whereby a field of view for each eye is partially overlapped by rotating the first pair of optical path deflectors to provide an expanded field of view including a single zone of binocular vision and a zone of monocular vision on each side of the single zone of binocular vision.

6 Claims, 3 Drawing Sheets

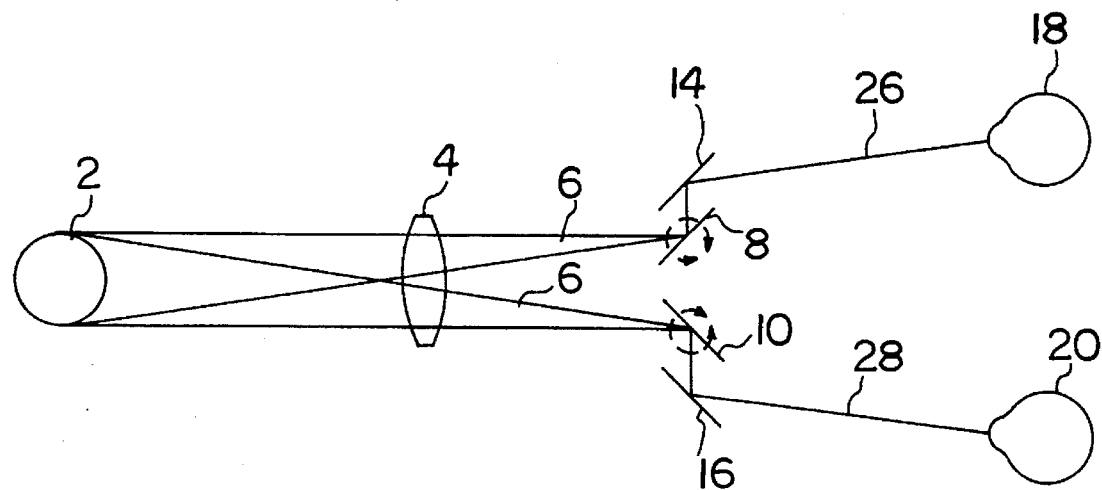
F I G. 1
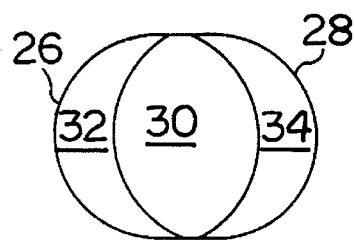
F I G. 2

BINOCULAR EXPANDED FIELD OF VIEW SPECTACLE MOUNTED MICROSCOPE

This is a continuation-in-part of application Ser. No. 08/040,458, filed Apr. 1, 1993 now abandoned.

BACKGROUND OF THE INVENTION

1. Field of the Invention

The present invention relates to magnification devices which provide binocular optical magnification of images for the visually impaired.

2. Prior Art

Persons who have a visual impairment require magnification in order to be able to read magazine size prints or see other small images. Magnification can be delivered by a simple plus lens which magnifies or amplifies the image. The image is projected through the eye onto the retina. The expansion or enlargement of the image by such simple magnification will circumvent central visual acuity losses or central visual field losses. The amount of magnification required can be determined and in the prior art microscopes which can be either of a simple form such as a singular plus lens or of a complex form utilizing a plus lens doublet system and additional lenses have been utilized to provide this magnification.

With such prior art systems, a problem optically has been known for many years in that the closer the focal length of the lens, the more difficult it is to provide binocularity to the visually impaired person. This has been dealt with in simple microscope prescriptions utilizing a singular high plus lens before each eye by incorporating base-in prisms which shift the image temporarily for each eye, providing more comfort and because of reduced convergence demand. Generally, binocularity can be tolerated up to approximately +12 diopters (3×) by means of an appropriate amount of base-in prism to establish fusion; however, when using powers above +12 diopters, the comfort zones decrease considerably because the working distance or focal length of the lens decreases to less than 12 cm.

This problem of the prior art has been partially alleviated by the development of the tele-microscope which is a Galilean Telescope with a reading cap to provide a greater focal length. However, such tele-microscopes are further limited by their power and the extent or scope of their visual field.

SUMMARY OF THE INVENTION

Accordingly, it is a general object of the present invention to provide a binocular expanded field of view spectacle mounted microscope yielding magnification greater than +12 diopters and a larger visual field and which enables the user the ability to fuse or integrate the images seen by each eye comfortably.

The above mentioned objects of the present invention are accomplished by a unique binocular expanded field of view spectacle mounted microscope including a single microscope provided in front of and mounted to a bridge of a spectacle frame, a first pair of optical path deflectors such as mirrors rotatably coupled to the spectacle frame on each side of the bridge and projecting into the line of sight and visual axis in a direction of the microscope, a second pair of optical deflectors such as mirrors mounted on the spectacle frame such that a line of sight and visual axis from the microscope deflected by the first pair of optical path deflectors is directed towards each eye of the wearer. With such a device, the field of view of each eye is partially overlapped by rotating the first pair of optical deflectors to provide an expanded field of view including a single zone of binocular vision and a zone of monocular vision on each side of the single zone of binocular vision. In this way, an expanded field of view can be provided.

BRIEF DESCRIPTION OF THE DRAWINGS

The above-mentioned features and objects of the present invention will become more apparent with reference to the following description taken with the accompanied drawings wherein like reference numerals denotes like elements and in which:

FIG. 1 denotes a first embodiment of a binocular expanded field of use spectacle mounted microscope in accordance with the teachings of the present invention;

FIG. 2 illustrates the partially overlapped field of view;

DETAILED DESCRIPTION OF THE INVENTION

Figure 3:
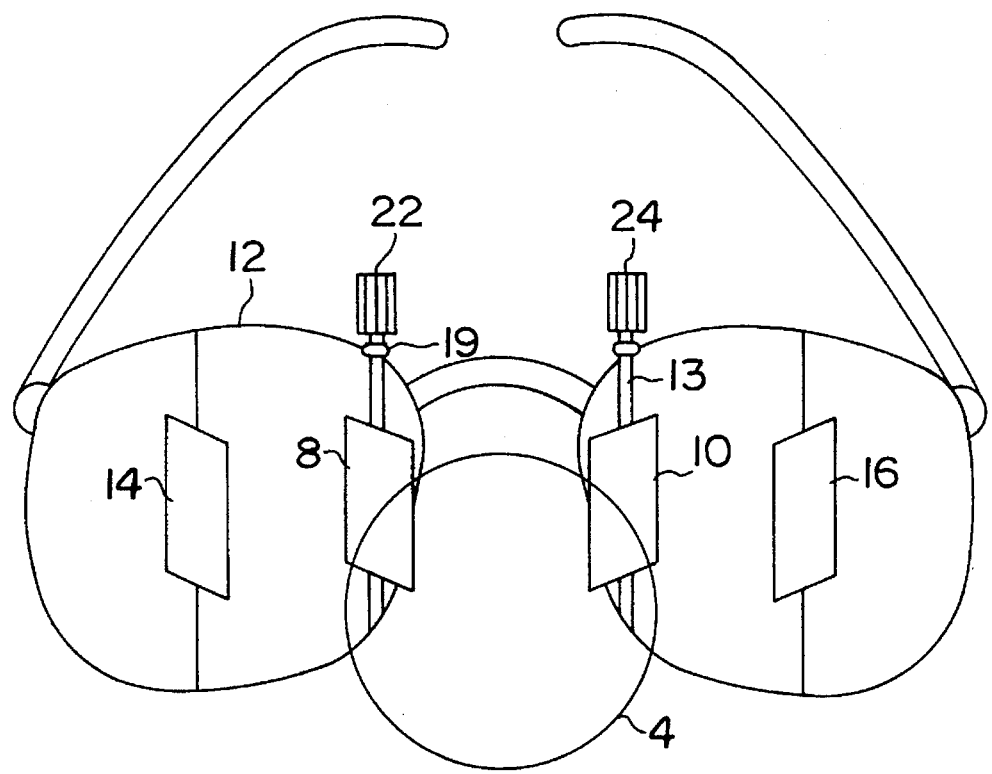
FIG. 3 illustrates the system or embodiment of FIG. 1 provided on a spectacle frame.

Referring to FIGS. 1–3, shown therein is the general construction of the first embodiment of the present invention. In this first embodiment, an object 2 is viewed by means of a microscope 4 and the line of sight of visual axis 6 passes through the microscope 4 wherein it is magnified and impinges on mirrors 8 and 10 rotatably mounted onto the spectacle frame 12. A second pair of reflecting mirrors 14 and 16 are mounted on the frame and reflect the line of sight and visual axis which has been reflected by the mirrors 8 and 10 toward the eyes 18 and 20 of a wearer.

The microscope 4 comprises a simple or compound microscope (plus lens doublet system) which itself comprises two convex lenses or a series of lenses and the magnification of the microscope is well in access of +12 diopters (3×). If such high magnification is not required, a simple microscope which includes a single convex lens could be utilized in the present invention and still provide the binocular expanded field of view. Also in some applications, a tele-microscope which comprises a Galilean Telescope with a reading cap could be utilized to provide a better comfort zone because of the greater focal length.

Figure 5:
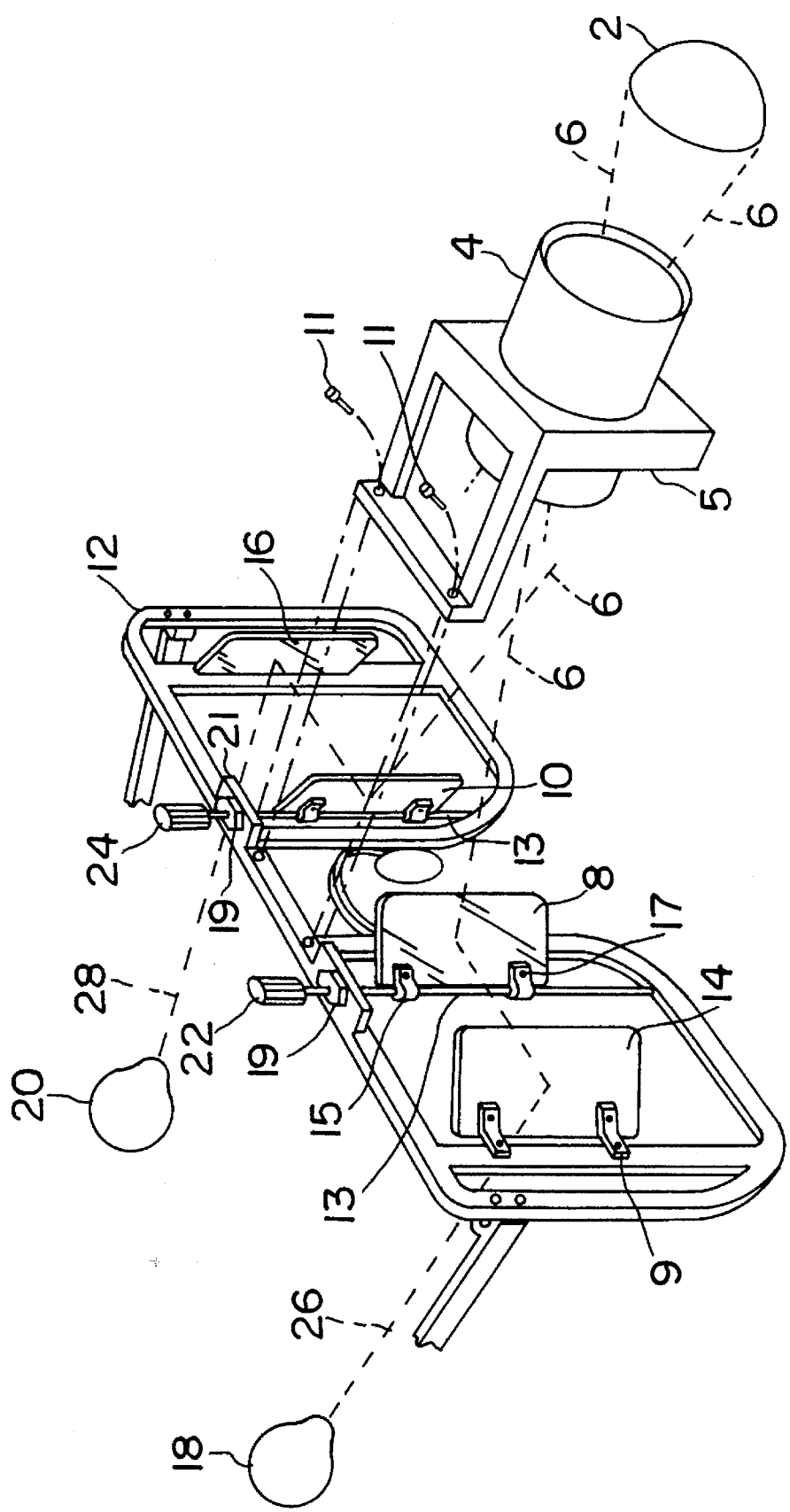
FIG. 5 is a detailed partially exploded view illustrating the construction of the first embodiment of the present invention.

Referring to FIG. 5, shown therein is a detailed partially exploded view of the construction of the first embodiment of the present invention. In this FIG. 5, a right angle bracket 5 is mounted to the bridge of the spectacle frame 12 by means of screws 11. The right angle bracket 5 supports the microscope 4 and in this way the microscope 4 is mounted to the bridge of the spectacle frame 12. The mirrors 8 and 10 are coupled to shafts 13 by means of clips 15 which surround the shaft 13 and are fixed to the mirrors 8 and 10 by means of rivets 17. The shafts 13 project through bearings 19 which are provided in holes in projections 21 formed on the spectacle frame 12. The mirrors 14 and 16 are further coupled to the spectacle frame 12 by means of bendable brackets 9 which are fixed to the mirrors 14 and 16 at one end and the spectacle frame 12 at the other.

In operation, the line of sight and visual axis 6 of the object 2 passes through the microscope 4 and is directed onto the rotatably mounted mirrors 8 and 10. The line of sight and visual axis then reflects from the mirrors 14 and 16 and is directed into the eyes 18 and 20 of the wearer of the spectacles 12.

The field of view seen binocularly through the microscope 4 can be imagined as a circle which impinges on the mirrors 8 and 10. Rotating or adjustment of the mirrors 8 and. 10 by means of the knobs 22 and 24, provides the cliptical binocular expanded field 26 and 28 which appears as is shown in FIG. 2. In particular, by rotating the mirrors 8 and 10, the field of view 26 and 28 to each of the eyes 18 and 20 can be set such that they do not entirely overlap and only partially overlap as is shown in FIG. 2. By partially overlapping the field of view 26 and 28 by means of rotating the mirrors 8 and 10 to displace the fields of view, an overlapping single zone of binocular vision 30 together with non-overlapping zones 32 and 34 which have monocular vision are provided on each side of the single zone of binocular vision 30. In this way, the field of view may be expanded while still creating at least a portion 30 wherein binocular vision is provided by the overlapping parts of the fields of view 26 and 28 directed towards the eyes 18 and 20 of the wearer.

Figure 4:
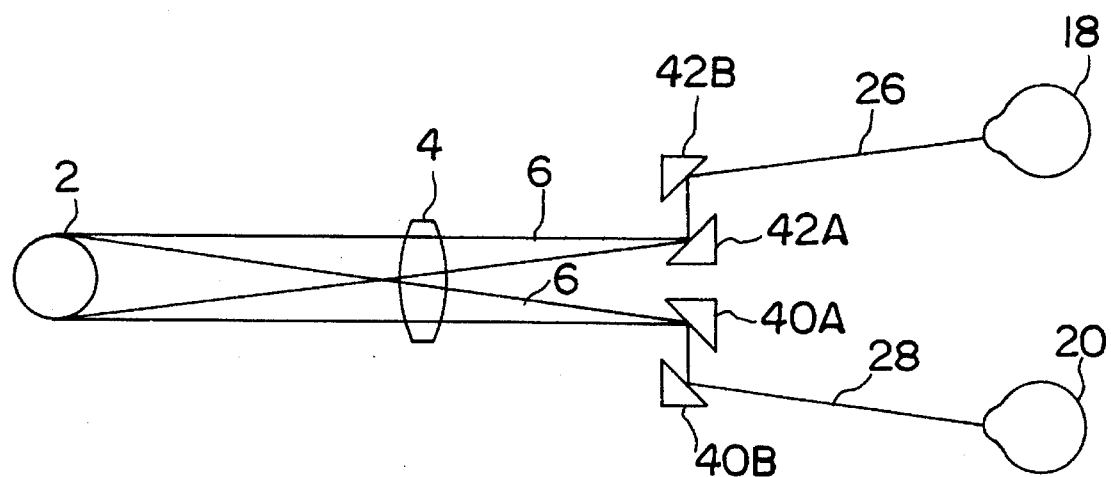
FIG. 4 illustrates a second embodiment of the present invention.

Referring to FIG. 4, shown therein is a second embodiment of the present invention which functions substantially the same as the first embodiment except that instead of utilizing mirrors as optical path deflectors, prisms 40A and 42A are rotatably provided on the spectacle frame 12 and prism 40B and 42B are fixed to the frame 12. Accordingly, by rotating the prisms 40A and 42A, the same type of expanded field of view which is illustrated in FIG. 2 can be created.

It should further be apparent that other optical deflecting means could be utilized in addition to the mirrors and prisms already shown and described above. Such optical deflecting means could include such optical devices as fiber optics, video imaging devices such as miniature CCD Video Cameras and active or passive matrix liquid crystal displays. The only requirement is that the optical deflector be capable of displacing the fields of view, line of sight and visual axis to each of the eyes of the wearer in the manner illustrated in FIG. 2.

It should be apparent to those skilled in the art that the above-described embodiments are merely illustrative of the embodiments of the present invention; and numerous and varied other arrangements of the present invention should be readily apparent to those skilled in the art.

I claim:

1. A binocular expanded field of use spectacle mounted microscope for a visually impaired person comprising:

a single microscope provided in front of, mounted to and extending from a bridge of a spectacle frame;

a first pair of optical path deflecting means, each of said first pair of optical path deflecting means being rotatably coupled to said spectacle frame on each side of said bridge and projecting into a line of sight and visual axis of said microscope and having a light deflecting surface facing in a direction of said microscope said first pair of optical path deflecting means being rotated to partially overlap said line of sight; and a second pair of optical path deflecting means, each of said second pair of optical path deflecting means being mounted on said spectacle frame such that said line of sight and visual axis from said microscope deflected by said first pair of optical path deflecting means is directed toward each eye of a wearer;

whereby said line of sight of said each eye of a wearer is partially overlapped and over converged by rotating said first pair of optical path deflecting means to provide an expanded field of view comprising a single zone of binocular vision and a zone of monocular vision on each side of said single zone of binocular vision.

2. A binocular expanded field of view spectacle mounted microscope according to claim 1 wherein said microscope is selected from the group consisting of complex microscopes, singular complex microscopes, or tele-microscopes.

3. A binocular expanded field of view spectacle mounted microscope according to claim 2 wherein said first and second pair of optical path deflecting means each comprise mirrors.

4. A binocular expanded field of view spectacle mounted microscope according to claim 2 wherein said first and second pair of optical path deflecting means comprise prisms.

5. A binocular expanded field of view spectacle mounted microscope according to claim 2 wherein said microscope has a power of at least +12 diopters.

6. A binocular field of use spectacle according to claim 1, wherein said single microscope has a magnification over 3×.

* * * * *